United States Patent [19]

Theirl et al.

[11] Patent Number: 5,227,916
[45] Date of Patent: Jul. 13, 1993

[54] ADJUSTABLE MOUNTING MECHANISM FOR AN OPTICAL FILTER SCREEN

[75] Inventors: Scott G. Theirl, St. Paul; Gerald E. Drake, Oakdale, both of Minn.

[73] Assignee: Minnesota Mining and Manufacturing Company, Saint Paul, Minn.

[21] Appl. No.: 882,588

[22] Filed: May 13, 1992

[51] Int. Cl.$^5$ ............................................. G02B 27/00
[52] U.S. Cl. .................................. 359/609; 359/601; 358/252; 358/253
[58] Field of Search .............. 359/601, 609, 610, 613, 359/614, 892; 358/248, 249, 250, 252, 253

[56] References Cited

U.S. PATENT DOCUMENTS

| | | | |
|---|---|---|---|
| 4,427,264 | 1/1984 | Kammerling | 359/601 |
| 4,529,268 | 7/1985 | Brown | 359/601 |
| 4,577,928 | 3/1986 | Brown | 359/609 |
| 4,848,874 | 7/1989 | Mui et al. | 359/609 |

OTHER PUBLICATIONS

Product literature entitled "Mounting and Care Instructions" from Optical Coating Labs, Santa Rosa, California.
Product literature entitled "Polaroid CP Computer Filter" from Polaroid Corporation, Cambridge, Massachusetts.
Product literature entitled "3M 'Universal' Privacy Filter" from Minnesota Mining and Manufacturing Company, St. Paul, Minnesota.

*Primary Examiner*—Loha Ben
*Attorney, Agent, or Firm*—Gary L. Griswold; Walter N. Kirn; Stephen W. Buckingham

[57] ABSTRACT

An optical filter screen for a visual display monitor includes an optical filter supported by a support frame. A pair of adjustable mounting members support the support frame from the visual display monitor such that the optical filter is positioned adjacent a display area of the display monitor. Each mounting member includes a latch member that is movable between an unlatched state wherein the filter can be moved relative to the display area of the display monitor and a latched state wherein the filter is held in a desired position relative to the display area. Each mounting member further includes a movable latch operator for moving the latch member between the latched state and the unlatched state.

12 Claims, 5 Drawing Sheets

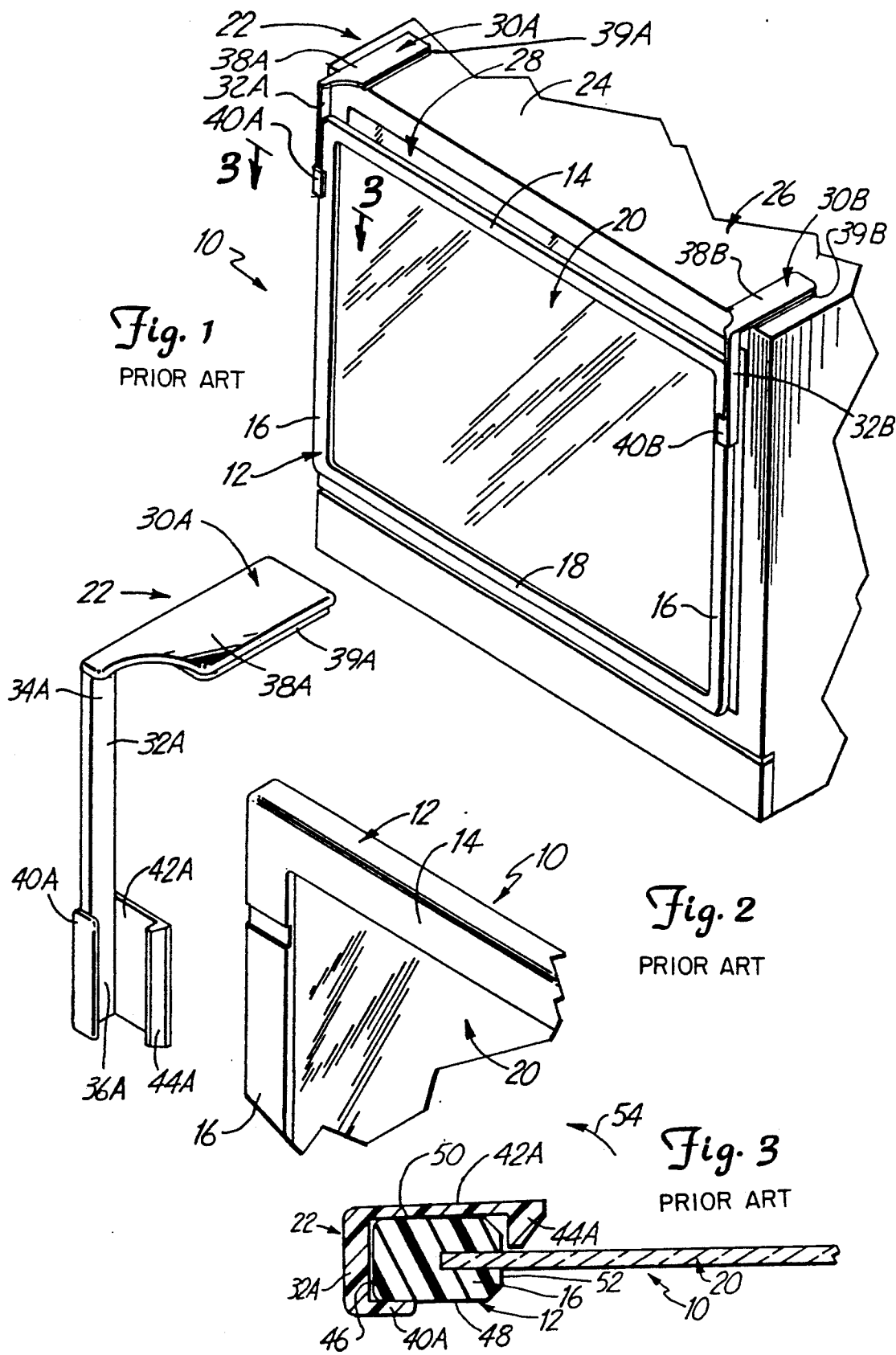

ADJUSTABLE MOUNTING MECHANISM FOR AN OPTICAL FILTER SCREEN

BACKGROUND OF THE INVENTION

The present invention relates generally to the field of optical filter screens. In particular, the present invention is an adjustable mounting mechanism for an optical filter screen usable with a visual display monitor.

Typically, translucent, optical filter screens are mounted to visual display monitors (e.g., computer monitors that employ a scanning electron tube display area) in such a manner as to extend over the front of the display area, their purpose being to reduce glare, increase contrast, provide privacy, provide radiation shielding, or a combination of these functions. By reducing the glare from the display area of the display monitor or increasing its contrast, eye fatigue associated with the prolonged use of display monitors is greatly reduced.

Optical filter screens having mounting mechanisms for securing the screens to visual display monitors are generally known. One antiglare screen and mounting mechanism is available from Optical Coating Labs Inc. and is shown in prior art FIGS. 1-3. As seen in FIG. 1, the prior art optical antiglare screen 10 includes a frame 12 defined by a top member 14, side members 16 and a bottom member 18. Supported within the frame 12 is a translucent, optical antiglare filter 20. A mounting mechanism 22 supports the antiglare screen 10 from a top surface 24 of a visual display monitor, such as a computer monitor 26, so that the optical antiglare filter 20 is positioned in front of a display area 28 of the computer monitor 26. The mounting mechanism 22 includes a pair of mounting members 30A and 30B. The mounting member 30B is a mirror image of the mounting member 30A, so only the mounting member 30A will be described with particularity.

As seen best in prior art FIG. 2, the mounting member 30A includes a stem element 32A having a first end 34A and a second end 36A. Integral with the first end 34A of the stem element 32A is a support element 38A that extends substantially perpendicular to the longitudinal extent of the stem element 32A. As seen best in prior art FIG. 1, the support elements 38A and 38B of the mounting members 30A and 30B, respectively, are adapted to engage the top surface 24 of the computer monitor 26 to support the antiglare screen 10. As seen best in prior art FIG. 2 a bottom surface of the support element 38A includes a foam rubber pad 39A which helps to prevent movement of the mounting member 30A and thereby the optical antiglare filter 20 relative to the display area 28 of the computer monitor 26.

The second end 36A of the stem element 32A includes a first, short leg 40A and a second, long leg 42A. The short leg 40A and the long leg 42A are integral with and extend substantially perpendicular to the stem element 32A. A free end of the long leg 42A includes an outwardly extending ledge portion 44A.

As seen best in prior art FIG. 3, when the mounting member 30A is secured to the side member 16 of the optical antiglare screen 10, the stem element 32A engages an outer surface 46, the short leg 40A engages a front surface 48 and the long leg 42A engages a rear surface 50 of the side member 16. The ledge portion 44A of the long leg 42A is adapted to engage an inner surface 52 of the side member 16 of the antiglare screen 10. The stem element 32A, short leg 40A, long leg 42A and ledge portion 44A are configured to closely conform to the side member 16 so as to securely fix the mounting member 30A to the frame 12 and thereby maintain the position of the mounting member 30A along the side member 16.

As seen in prior art FIG. 3, the position of the mounting member 30A along the side member 16 can be changed by simply flexing the long leg 42A outwardly in the direction of arrow 54, which causes the ledge portion 44A to ride over the inner surface 52 allowing the mounting member 30A to be disengaged from the side member 16 of the frame 12. By changing the position of the mounting members 30A and 30B along the side members 16 of the frame 12, the antiglare filter 20 can be centered relative to the display area 28 of the computer monitor 26. However, to change the positions of the mounting members 30A and 30B, the mounting members 30A and 30B need to be disengaged from and then re-engaged with the frame 12 in their desired positions. As such, it is sometimes difficult to reattach the mounting members 30A and 30B to the respective side members 16 of the frame 12 in exactly the same position such that the frame 12 is level and the antiglare filter 20 is centered on the display area 28. Hence, to properly adjust the antiglare screen 10 of the prior art, at least one of the mounting members 30A and 30B may have to be disengaged from and re-engaged with the frame 12 several times until the antiglare filter 20 is level and adequately centered with respect to the display area 28 of the monitor 26.

Another filter screen and mounting mechanism known as 3M "Universal" Privacy Filter is available from the Minnesota, Mining and Manufacturing Company and is shown in prior art FIGS. 4-6. As seen in FIG. 4, the prior art filter screen 60 includes a frame 62 defined by a top member 64, side members 66 and a bottom member 68. Supported within the frame is a louvered filter 70. A mounting mechanism 72 supports the filter screen 60 from a top surface 74 of a visual display monitor, such as a computer monitor 76, such that the filter 70 is positioned in front of a display area (not seen in FIG. 4) of the monitor 76.

As seen best in prior art FIGS. 5 and 6, the mounting mechanism 72 includes a top mount 78 having a first end 79 and a second end 80. Adhesively secured to a bottom surface 81 (see FIG. 6) of the first end 79 is a first element 82 of a hook and loop fastener. A second cooperating element 83 of hook and loop fastener is adhesively secured to the top surface 74 of the monitor 76. The first and second elements 82 and 83 allow the top mount 78, and thereby the filter screen 60, to be attached to and removed from the monitor 76.

The second end 80 of the top mount 78 is adapted to be received in a slot 84 in the top member 64 of the frame 62. As seen best in prior art FIG. 5, within the slot 84 are a pair of spaced latch members 86. As seen best in prior art FIG. 6, each latch member 86 is integral with the top member 64 of the frame 62 and is defined by an upright element 87 having a rounded ledge portion 88. The rounded ledge portions 88 of the latch members 86 are adapted to selectively engage recesses 90 on the rear surface of the second end 80 of the top mount 78. The recesses 90 are separated by rounded ridges 92.

When the ledge portions 88 are engaged with selected recesses 90, the position of the filter screen 60 is fixed relative to the top member 78. To adjust the position of the filter screen 60 relative to the top member 78, the frame 62 is moved (i.e., pulled or pushed), as represented by doubled headed directional arrow 94, relative to the top member 78, which causes the rounded ledge portions 88 to ride over the rounded ridges 92 and flexing of the upright elements 87 of the latch members 86. The frame 62 is moved relative to the top member 78 until the ledge portions 88 engage the desired recesses 90 and the privacy filter 70 is level and centered on the display area of the monitor 76. However, due to the amount of pulling or pushing force needed to cause the ledge portions 88 to ride over the ridges 90 and flexing of the upright elements 87 of the latch members 86, the ledge portions 88 may move past (i.e., miss) the desired recesses 90. Hence, to properly adjust the filter screen 60 of the prior art, the frame 62 may have to be pushed and pulled several times relative to the top member 78 until the filter 70 is level and adequately centered with respect to the display area of the monitor 76.

There is a continuing need for improved optical filter screens with adjustable mounting mechanisms. Specifically, there is a need for an adjustable mounting mechanism that allows an optical filter screen to be smoothly and easily adjusted relative to a display area of a monitor without using a great deal of force or removing the mounting mechanism from the filter screen. Moreover, there is a need for an adjustable mounting mechanism that allows the filter element of the filter screen to be easily leveled and properly centered with respect to the display area of a monitor with minimal manual manipulation.

SUMMARY OF THE INVENTION

The present invention is an optical filter screen for a visual display monitor. The filter screen includes an optical filter supported by a support frame. An adjustable mounting mechanism, defined by a pair of mounting members, supports the support frame from the visual display monitor such that the antiglare filter is positioned adjacent a display area of the display monitor. Each mounting member includes a latch member that is movable between an unlatched state wherein the antiglare filter can be moved relative to the display area of the display monitor and a latched state wherein the antiglare filter is held in a desired position relative to the display area. Each mounting member further includes a movable latch operator for moving the latch member between the latched state and the unlatched state.

This optical filter screen with adjustable mounting mechanism is relatively uncomplicated. By providing the filter screen with a pair of mounting members, with each mounting member having a latch member and a latch operator to move the latch member between a latched state that holds the filter screen in a desired position relative to a display area of a monitor and an unlatched state that allows movement of the filter screen relative to the display area, the filter screen can be smoothly and easily adjusted relative to the display area without using a great deal of force or removing the mounting members from the filter screen. Therefore, this mounting member arrangement allows the filter of the filter screen to be easily leveled and properly centered with respect to the display area of the monitor with minimal manual manipulation.

BRIEF DESCRIPTION OF THE DRAWINGS

FIG. 1 is a perspective view showing a prior art optical filter screen and mounting mechanism secured to a visual display monitor.

FIG. 2 is an enlarged perspective view of a mounting member of the prior art mounting mechanism of FIG. 1 shown removed from the prior art filter screen.

FIG. 3 is a sectional view taken along line 3—3 in FIG. 1 of the prior art mounting member secured to the prior art filter screen.

DETAILED DESCRIPTION OF THE PREFERRED EMBODIMENT

Figure 4:
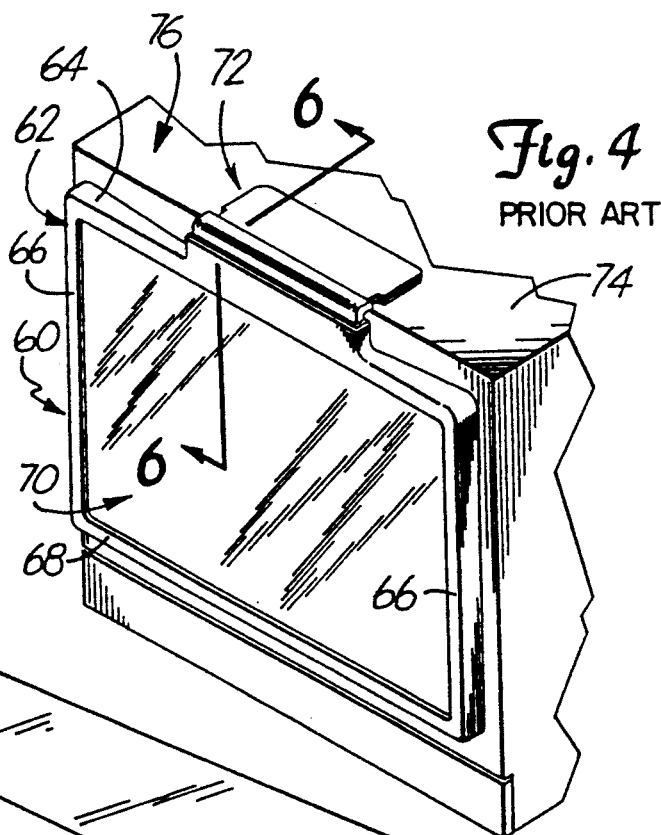
FIG. 4 is a perspective view of another prior art optical filter screen and mounting mechanism secured to a visual display monitor.
Figure 5:
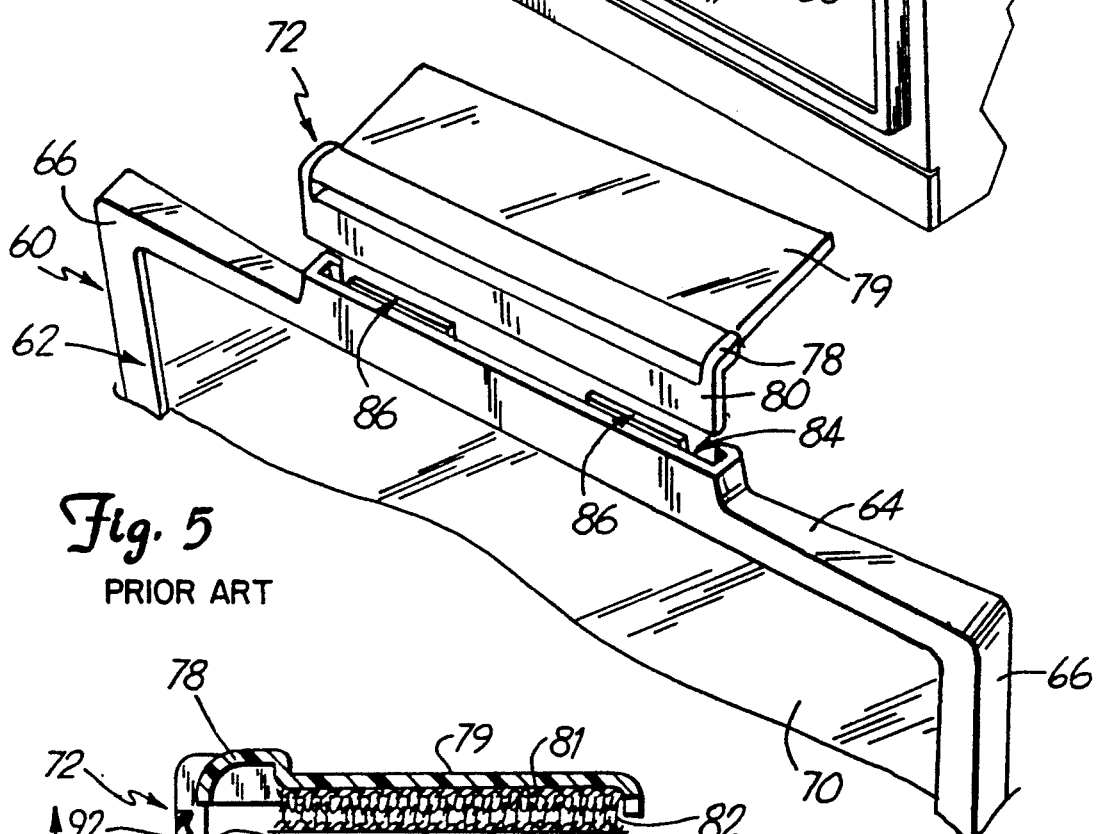
FIG. 5 is an enlarged, exploded perspective view showing details of the prior art mounting mechanism shown in FIG. 4.
Figure 6:
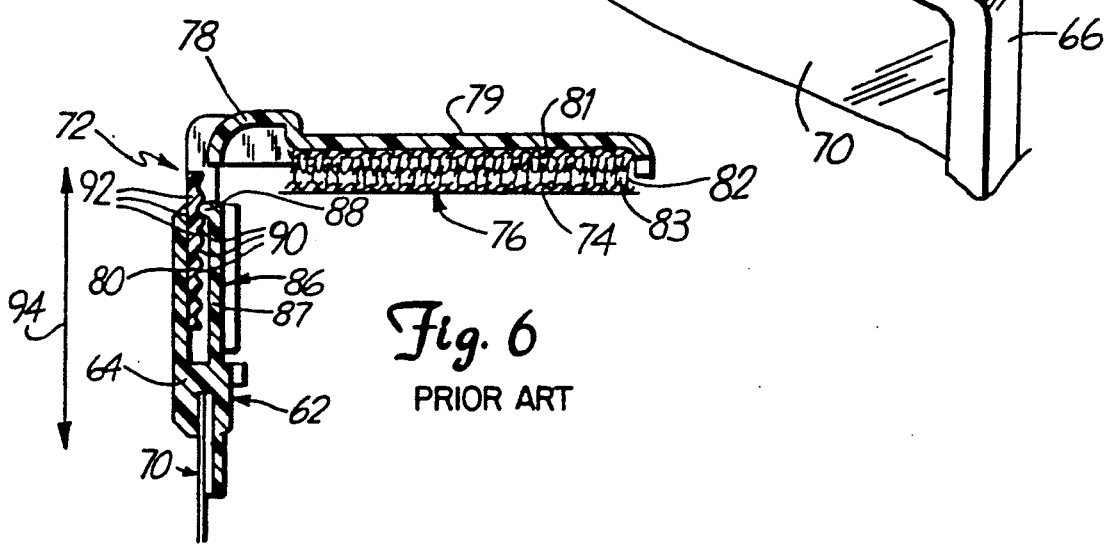
FIG. 6 is a sectional view taken along line 6—6 in FIG. 4 showing particulars of the prior art mounting mechanism.
Figure 7:
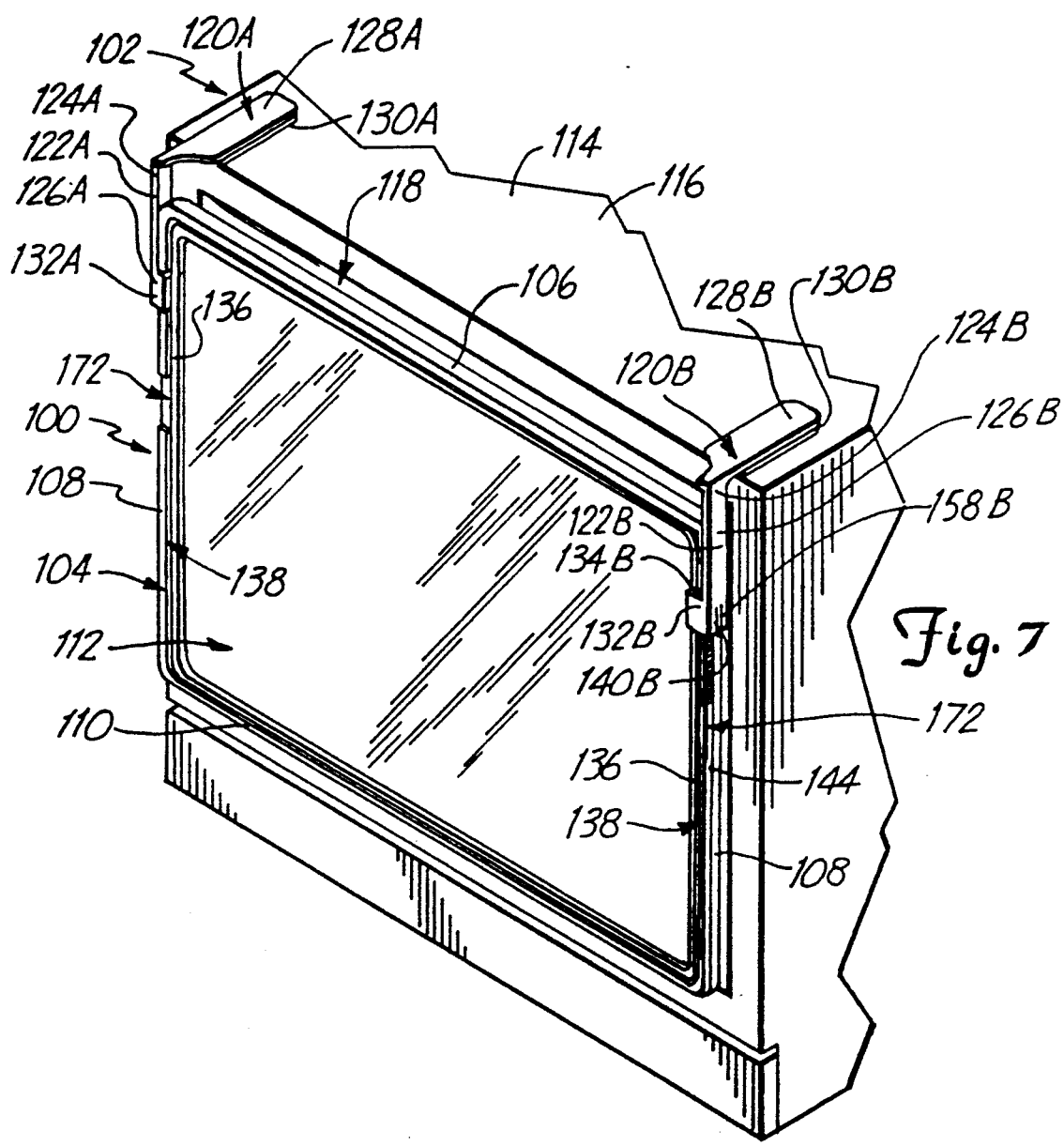
FIG. 7 is a perspective view of an optical filter screen and mounting mechanism in accordance with the present invention.
Figure 8:
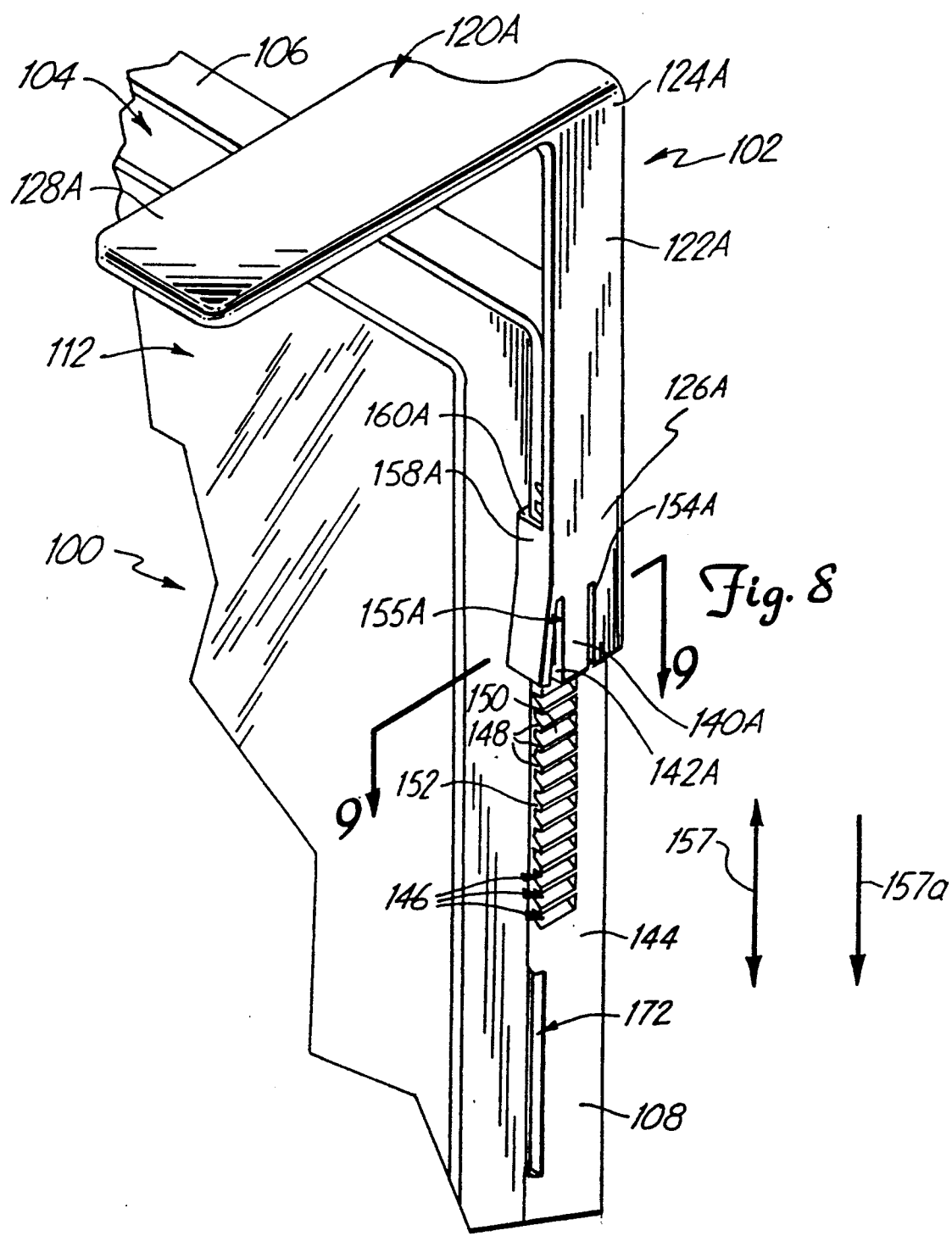
FIG. 8 is an enlarged perspective view showing details of a mounting member of the mounting mechanism and a side member of the filter screen of FIG. 7.

An optical filter screen 100 having a mounting mechanism 102 in accordance with the present invention is illustrated generally in FIGS. 7 and 8. The filter screen 100 includes a frame 104 defined by a top member 106, side members 108 and a bottom member 110. Supported within the frame 104 is an optical filter 112. As seen best in FIG. 7, the mounting mechanism 102 supports the filter screen 100 from a top surface 114 of a visual display monitor, such as a computer monitor 116, so that the optical filter 112 is positioned in front of a display area 118 of the computer monitor 116. The mounting mechanism 102 includes a pair of mounting members 120A and 120B. The mounting member 120B is a mirror image of the mounting member 120A so only the mounting member 120A will be described with particularity.

As seen best in FIG. 8, the mounting member 120A includes a stem element 122A having a first end 124A and a second end 126A. Integral with the first end 124A of the stem element 122A is a support element 128A that extends substantially perpendicular to the longitudinal extent of the stem element 122A. As seen best in FIG. 7, the support elements 128A and 128B of the mounting members 120A and 120B, respectively, are adapted to engage the top surface 114 of the computer monitor 116 to support the filter screen 100, such that the filter 112 is positioned in front of the display area 118 of the monitor 116. Bottom surfaces of the support elements 128A and 128B include foam rubber pads 130A and 130B, respectively, which help to prevent movement of the mounting members 120A and 120B and thereby the optical screen 100 relative to the display area 118 of the computer monitor 116.

Figure 9:
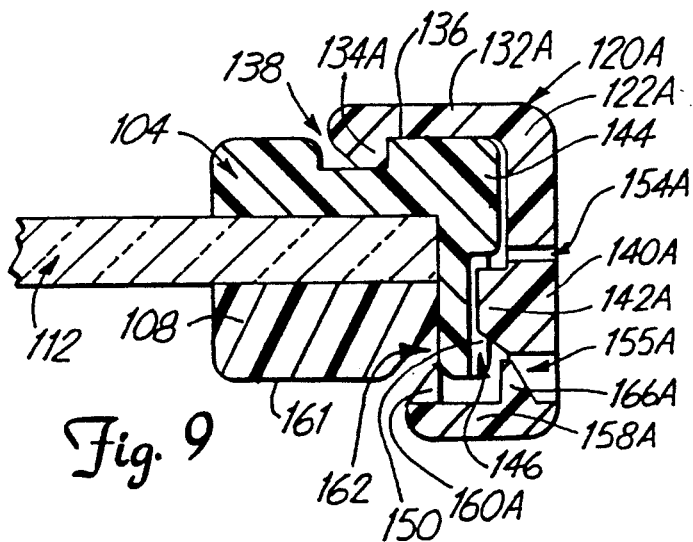
FIG. 9 is a sectional view taken along line 9—9 in FIG. 8 showing a latched state of a latch member of the mounting member shown in FIG. 8.
Figure 10:
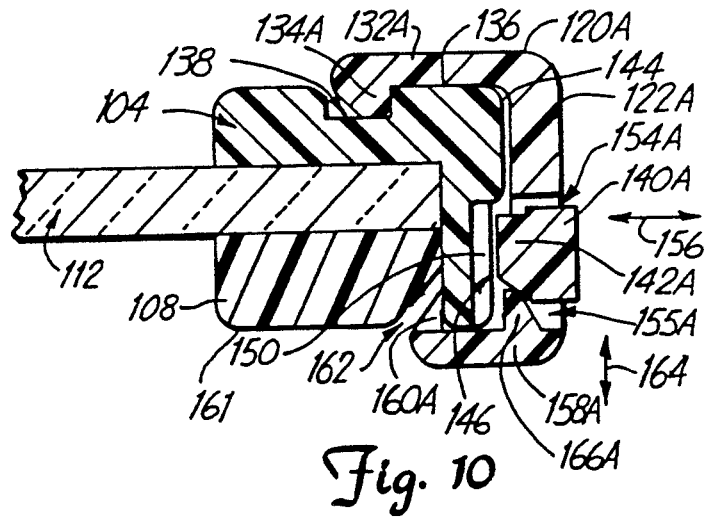
FIG. 10 is a sectional view, similar to FIG. 9, showing an unlatched state of the latch member of the mounting member.
Figure 11:
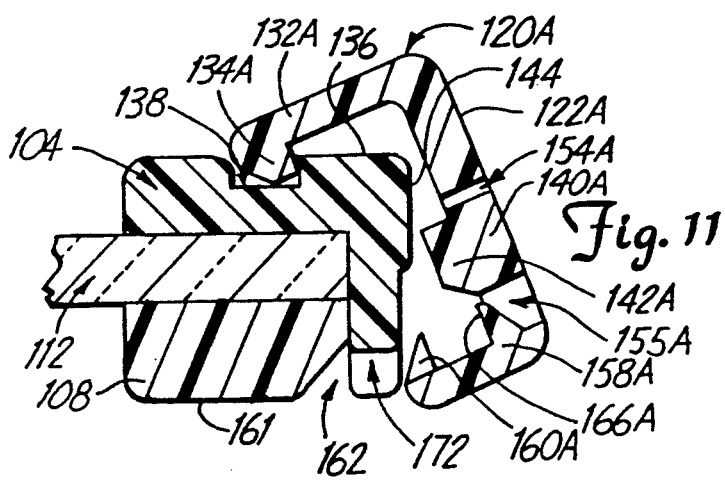
FIG. 11 is a sectional view, similar to FIG. 9, with the mounting member being removed from the side member of the antiglare screen in accordance with the present invention.

As seen best in FIGS. 9-11, the second end 126A of the stem element 122A includes a first leg 132A that is integral with and extends substantially perpendicular to the stem element 122A. A free end of the first leg 132A includes an outwardly extending ledge portion 134A. When the mounting member 120A is secured to the side member 108 of the frame 104, the first leg 132A abuts a front surface 136 of the side member 108 and the ledge portion 134A engages a longitudinal channel 138 that extends along the length of the side member 108. The longitudinal channel 138 allows the mounting member 120A to be the moved along the length of the side member 108.

The second end 126A of the stem element 122A further includes a movable latch member 140A that is integral with the stem element 122A. A free end of the latch member 140A includes an outwardly extending latch ledge 142A. As seen best in FIG. 8, an outer surface 144 of the side member 108 includes a plurality of linearly arranged latch recesses 146. The latch recesses are separated by latch ridges 148, with each latch ridge 148 having an angled top surface 150 and a substantially perpendicular bottom surface 152.

As seen in FIG. 8, the stem element 122A includes cutouts 154A and 155A to either side of the latch member 140A. The cutouts 154A and 155A allow the latch member 140A to flex (i.e. move) relative to the side member 108 of the frame 104 in a direction substantially parallel to the antiglare filter 112 as presented by the double headed directional arrow 156 in FIG. 10. The latch member 140A is movable (i.e., can be flexed) between an unlatched state wherein the filter screen 100 can be vertically moved (as presented by the double headed directional arrow 157 in FIG. 8) relative to the mounting members 120A and 120B and the display area 118 of the computer monitor 116, and a latched state wherein the filter screen 100 is held in a desired position relative to the display area 118. The latch ledge 142A is engageable with any one of the plurality of latch recesses 146 to define the desired position of the antiglare screen 100.

Mounting member 120A further includes a second leg, or latch operator 158A which is integral with and extends substantially perpendicular to the longitudinal extent of the stem element 122A. A free end of the latch operator 158A includes an outwardly extending ledge element 160A. As seen in FIGS. 9-11, when the mounting member 120A is secured to the side member 108 of the frame 104, the latch operator 158A is adjacent a rear surface 161 of the side member 108 and the ledge element 160A engages a longitudinal slot 162 that extends along the length of the side member 108. The longitudinal slot 162 allows the mounting member 120A to be moved along the length of the side member 108.

As seen best in FIG. 10, the cutout 155A, allows the latch operator 158A to flex (i.e., move) in a direction (as represented by double headed directional arrow 164 in FIG. 10) perpendicular to the stem element 122A. The latch operator 158A is manually movable (i.e., by finger pressure) between a disengaged state, wherein a cam member 166A of the latch operator 158A is spaced from a beveled surface 170A of the latch member 140A (see FIG. 9), and an engaged state, wherein the cam member 166A is engaged with the beveled surface 170A of the latch member 140A and thereby moves the latch member 140A out of engagement with a recess 146 and thereby permits the mounting member 120A to be moved relative to the filter screen 100. Movement of the filter screen 100 relative to the mounting members 120A and 120B allows the filter 112 to be easily leveled and properly centered with respect to the display area 118 of the monitor 116.

In addition, the mounting member 120A can be moved in one direction (as represented by the directional arrow 157) relative to the filter screen 100 and without actuation of the latch operator 158A, due to the angled top surfaces 150 of the ridges 148. The angled top surfaces 150, upon the application of sufficient force to the mounting member allows the latch member 140A to simply ride over the ridges 148. The perpendicular bottom surfaces 152 of the ridges 148 would prevent such ease of movement in the opposite direction to that indicated by arrow 157a.

As seen in FIG. 8, the outer surface 144 of the side member 108 further includes a cutout 172 located below the recesses 146. As seen in FIG. 11, when the mounting member 120A is positioned such that the ledge element 160A is centered within the cutout 172, the mounting member 120A can be removed from the side member 108 of the frame 104 for the purpose of cleaning or to replace a damaged mounting member.

The optical filter screen 100 with adjustable mounting mechanism 102 is relatively uncomplicated. By providing the filter screen 100 with a pair of mounting members 120A and 120B, with each mounting member 120A and 120B having a latch member 140A and 140B and a latch operator 158A and 158B to move the latch member 140A and 140B between a latched state that holds the filter screen 100 in a desired position relative to the display area 118 of the monitor 116 and an unlatched state that allows movement of the filter screen 100 relative to the display area 118, the filter screen 100 can be smoothly and easily adjusted relative to the display area 118 without using a great deal of force or removing the mounting members 120A and 120B from the filter screen 100. Therefore, this mounting member arrangement allows the filter 112 of the filter screen 100 to be easily leveled and properly centered with respect to the display area 118 of the monitor 116 with minimal manual manipulation.

Although the present invention has been described with reference to preferred embodiments, workers skilled in the art will recognize that changes may be made in form and detail without departing from the spirit and scope of the invention.

What is claimed is:

1. An optical filter screen for a visual display monitor, comprising:

a support frame defined by a top member, first and second side members and a bottom member;

an optical filter supported by the support frame; and an adjustable mounting means for supporting the support frame from a visual display monitor such that the filter is positioned adjacent a display area of the display monitor, the mounting means including:

a latch means movable between an unlatched state wherein the filter can be moved relative to the display area of the display monitor and a latched state wherein the optical filter is held in a desired position relative to the display area of the display monitor; and a movable latch operating means for moving the latch means between the unlatched state and the latched state.

2. The filter screen of claim 1 wherein the latch means is movable in a first direction between the latched state and the unlatched state, and the latch operating means is movable in a second direction substantially perpendicular to the first direction to actuate the latch means between the latched and unlatched states.

3. The filter screen of claim 1 wherein the mounting means includes:

first and second mounting members engageable with the first and second side members, respectively of the support frame, each mounting member including a latch means defined by a movable latch member and a latch operating means defined by a movable latch operator.

4. The filter screen of claim 3 wherein each mounting member includes:

a stem element having a first end and an opposite second end: and a support element extending outwardly from the first end of the stem element, the support element being adapted to engage a top surface of the visual display monitor for supporting the support frame of the filter screen.

5. The filter screen of claim 4 wherein each of the first and second side members includes a longitudinal channel, and wherein each mounting member further includes:

a leg member extending outwardly from the second end of the stem element, the leg member having a ledge portion that is adapted to engage the longitudinal channel of the respective side member of the support frame, the longitudinal channel allowing longitudinal movement of the mounting member relative to the side member of the support frame.

6. The filter screen of claim 5 wherein each of the first and second side members further includes a longitudinal slot, and wherein the latch operator of each mounting member includes:

a ledge element that is adapted to engage the longitudinal slot of the respective side member of the support frame, the longitudinal channel allowing longitudinal movement of the mounting member relative to the side member of the support frame.

7. The filter screen of claim 6 wherein each of the first and second side members of the support frame further includes a cutout section along the longitudinal slot, that permits the ledge element of the respective mounting member to be disengaged from the slot to allow the mounting member to be removed from the support frame of the filter screen.

8. The filter screen of claim 3 wherein each of the first and second side members of the support frame includes a plurality of linearly aligned latch recesses, and wherein the latch member of the respective mounting member is selectively engageable with a desired latch recess, in the latched state of the latch member, to define the desired position of the antiglare filter relative to the display area of the display monitor.

9. The filter screen of claim 3 wherein each of the first and second side members includes a longitudinal slot, and wherein the latch operator of each mounting member includes:

a ledge element that is adapted to engage the longitudinal slot of the respective side member of the support frame, the longitudinal channel allowing longitudinal movement of the mounting member relative to the side member of the support frame.

10. The filter screen of claim 9 wherein each of the first and second side members of the support frame further includes a cutout section along the longitudinal slot, that permits the ledge element of the respective mounting member to be disengaged from the slot to allow the mounting member to be removed from the support frame of the filter screen.

11. The filter screen of claim 3 wherein the latch operator of each mounting member incudes a cam member and wherein the latch member is movable between a disengaged state, wherein a cam member is spaced from the latch member, and an engaged state, wherein the cam member is engaged with the latch member so as move the latch member from the latched state to the unlatched state and thereby permit the respective mounting member to be moved relative to the support frame.

12. The filter screen of claim 11 wherein the latch member is movable in a first direction between the latched state and the unlatched state, and the latch operator is movable in a second direction, substantially perpendicular to the first direction, between the engaged state and the disengaged state.

* * * * *